No. 884,118. PATENTED APR. 7, 1908.
A. WINTON.
LUBRICATOR.
APPLICATION FILED NOV. 12, 1904.
2 SHEETS—SHEET 1.
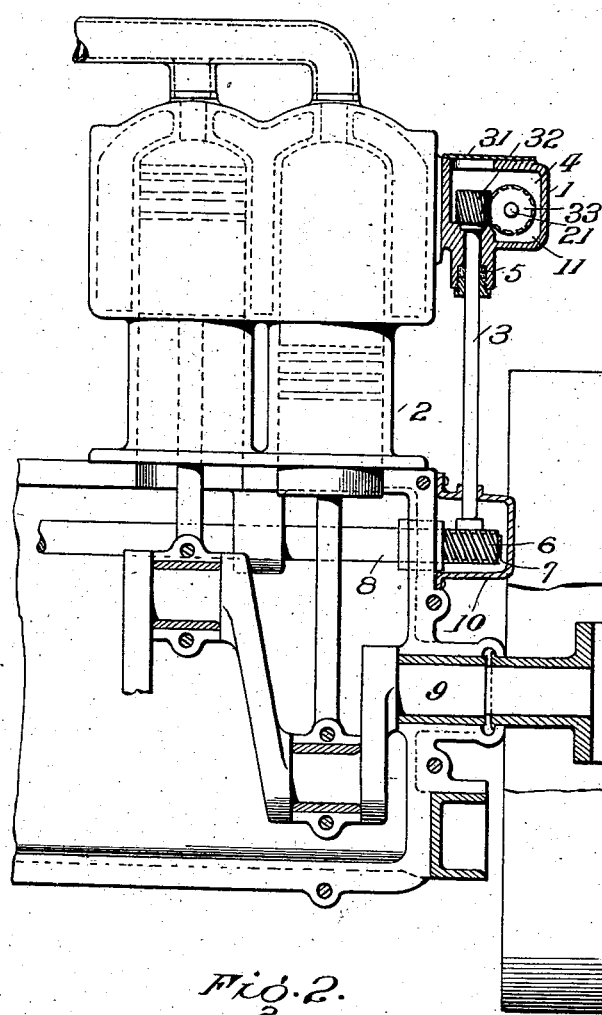
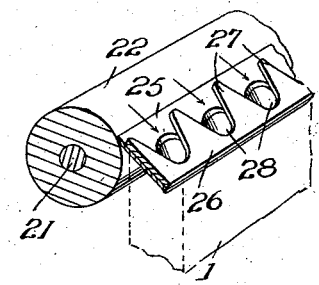
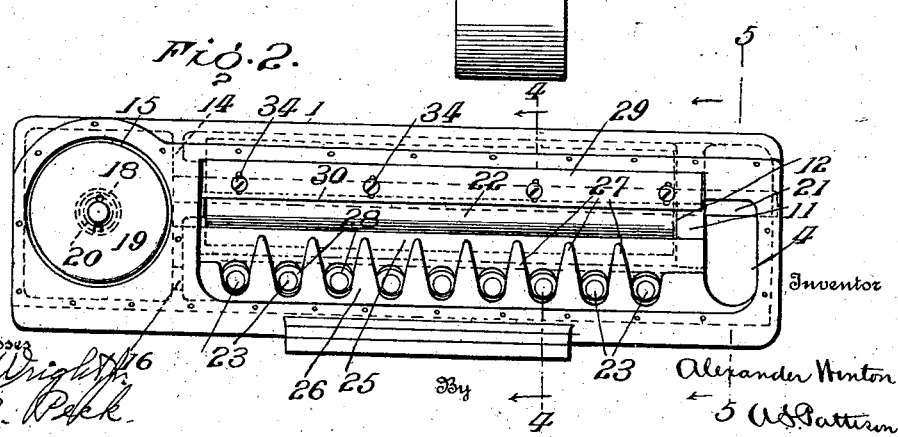

No. 884,118.
PATENTED APR. 7, 1908.
A. WINTON.
LUBRICATOR.
APPLICATION FILED NOV. 12, 1904.
2 SHEETS—SHEET 2.
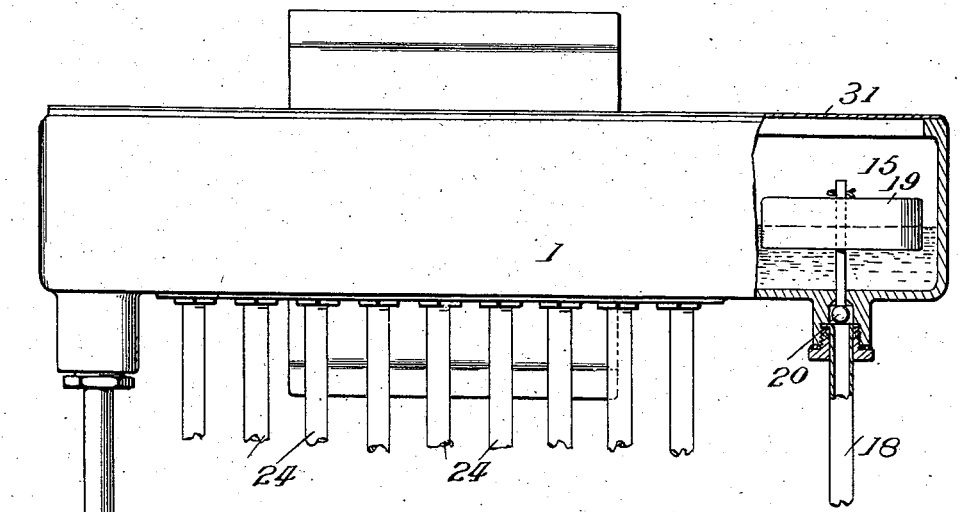
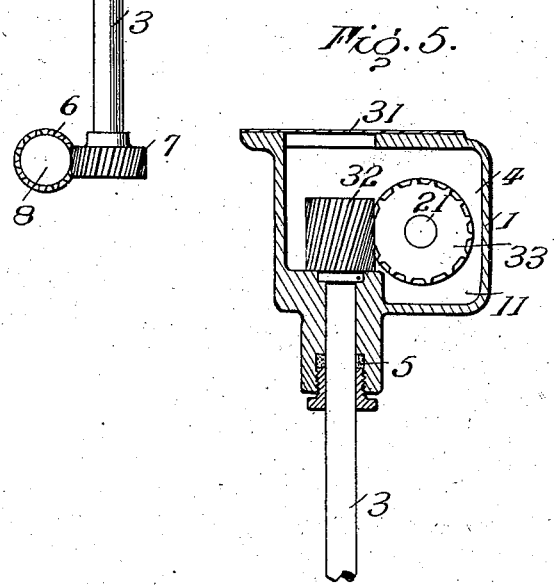
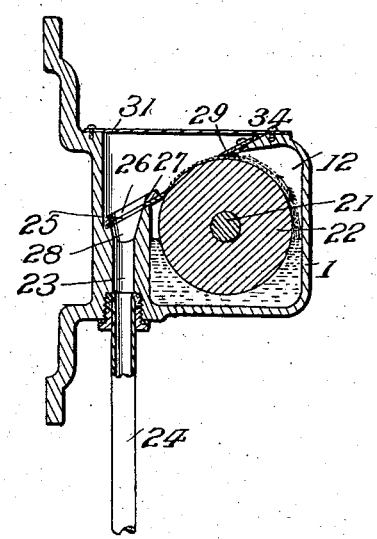
Witnesses
Inventor
Alexander Winton,
By A. S. Pattison,
Attorney

UNITED STATES PATENT OFFICE.

ALEXANDER WINTON, OF CLEVELAND, OHIO.

LUBRICATOR.

No. 884,118.  Specification of Letters Patent.  Patented April 7, 1908.

Application filed November 12, 1904. Serial No. 232,489.

*To all whom it may concern:*

Be it known that I, ALEXANDER WINTON, a citizen of the United States, residing at Cleveland, in the county of Cuyahoga and State of Ohio, have invented certain new and useful Improvements in Lubricators, of which the following is a specification, reference being had therein to the accompanying drawing.

This invention relates to improvements in lubricators, and is especially intended for lubricating the several parts of the mechanism used in propelling a motor vehicle, and the object of this invention is to provide a lubricator which will be certain in its action and will supply a uniform amount of oil, and in which the amount of oil will be controlled according to the speed of the parts to be oiled, that is to say when the mechanism is running slow there will be less oil fed than when the mechanism is running fast, and vice versa.

In the accompanying drawings, Figure 1, is a sectional view taken longitudinally through my improved lubricator, the same being shown in its operative connection with the driving mechanism of the motor which propels the vehicle. Fig. 2, is a top plan view of my improved lubricator with the removable sheet metal cap or cover detached. Fig. 3, is a view taken at right angles to Fig. 1. Fig. 4, is a sectional view on the line 4—4 of Fig. 2. Fig. 5, is a sectional view on the line 5—5 of Fig. 2. Fig. 6, is a detached perspective view of coöperating portions of the roll and gatherer.

In the preferred location and arrangement of the parts embodying my improvement, the lubricating chamber or box 1 is suitably bolted to the engine frame 2 and as shown, and this chamber or box is arranged in a horizontal position, and in order to effect the best results, should be substantially horizontal. A vertically-arranged lubricator drive shaft 3 has its upper end suitably journaled in the lower wall of a compartment or chamber 4 which is preferably located at one end of the box or chamber 1, and to prevent the leakage or waste of oil from this box or chamber 4, a suitable stuffing box arrangement for the upper end of the said shaft 3, such for instance as is shown at 5, is provided. The lower end of this lubricator drive shaft 3 is provided with a worm gear 6 which is in engagement with a driven worm 7 that is operatively connected with the motor. As here shown, this worm 7 is made fast to a projecting end of the cam shaft 8 of an explosive motor, and this cam shaft 8 is geared in the usual manner (not here shown) with the motor crank shaft 9. Preferably a suitable casting 10 is bolted to the engine frame for inclosing the said worm gear and worm and to form a journal and support for the lower end of the shaft 3.

A partition 11 separates the lubricator chamber 12 from the chamber 4, and a suitable partition 14 extending across the opposite end of the lubricator chamber 12 forms at the opposite end of said box 1 a float chamber 15. This float chamber 15 is in communication with the lubricator chamber 12 by means of a passage way 16 formed in the partition 14.

A suitable oil reservoir (not shown) will be located at any convenient point on the vehicle, and is in communication with the float chamber 15 through the medium of a suitable pipe or passage way 18. Placed within the float chamber 15 is a suitable float 19 which controls a valve 20, and the valve 20 in turn controls the admission of oil into the float chamber, so that oil is kept always at a predetermined and practically constant level in the float chamber. As before stated, the float chamber is in communication with the lubricator chamber 12 by means of the passage way 16, and as a consequence, the lubricating oil is maintained in the lubricating chamber 12 at a predetermined and practically constant level corresponding to the level of the oil in the float chamber.

Passing longitudinally through the lubricator chamber and having its end journaled in the partitions 11 and 14, is a lubricator shaft 21. Made fast to this lubricator shaft is a lubricating feed roll 22 which extends longitudinal the lubricator and preferably from end to end thereof.

An oil passage way (or as here shown, a plurality of oil passage ways) 23 extends upward within the lubricator chamber to a point above the maintained oil level, and connected with these passage ways 23 are oil conducting tubes or pipes 24. These oil conducting tubes or pipes will extend to the various parts of the mechanism to be lubricated, as is well understood by those skilled in this art, and need not be further illustrated or described. As here shown, there are nine passage ways, and there will consequently be nine oil-conducting tubes 24.

It will be understood, however, that there may be more or less passage ways according to the number of points to be lubricated, without departing from the present invention.

Located within the lubricator chamber and extending the length of the feed roll 22 is a sheet metal strip 25, and placed over this strip 25 is a strip 26 of toothed form. That is to say, the outer edge of this strip 26 is provided with a plurality of teeth, projections or arms 27, there being one tooth for each oil passage. The respective teeth or projections extend over or into the upper ends of the passage ways, which are counterbored, as shown at 28, to enlarge their upper ends. An adjustable strip 29 is placed at a point in advance of the feeder strips 25 and 26 in respect to the direction of rotation of the feed roll 22, and extends longitudinal the roll and is capable of adjustment towards and away from the surface of the roll, for a purpose to be hereafter described. The upper face or side of the chamber 12 is preferably provided with a longitudinal opening 30 directly over the strips 25, 26 and 29 to permit access thereto, and this opening is closed by means of a removable sheet metal cover 31.

The operation of the foregoing invention is as follows:—The oil is fed to the float chamber in the manner described, and the float maintains the oil in the float chamber and in the lubricator chamber at substantially a uniform level or depth in the latter. The motor being in motion, the feed roll 22 is slowly revolved through the medium of the worm gears before described, and through the medium of a worm 32 on the upper end of the lubricator drive shaft 3, the said worm being in mesh with a worm gear 33 fast to the feed roll shaft 21. The feed plate or strip 25 is so adjusted as to just touch the periphery of the feed roll. As the feed roll revolves it gathers and carries a film of oil which is scraped therefrom by the feeder strip, and passes down the said inclined strip to the teeth or projections 27, and from the teeth or projections into the upper end of the passage ways 23, thence to the conductor tubes 24, by which the oil is conveyed to the points to be lubricated. To facilitate the passage of the oil on the feeder strips, they are preferably at a suitable incline or angle as shown.

From the foregoing, it will be understood that when the motor is revolving slowly, the feed roll revolves at a predetermined relatively corresponding speed, and uniformly increases in its rotation with the increase of the speed of the motor. The faster the feed roll revolves, the more oil it will deliver to the gatherer. As a consequence, a minimum amount of oil is fed to the parts to be lubricated when a small amount is required, a maximum amount fed when a large amount is required, and a correspondingly graduated amount of oil is fed between the minimum and maximum feed, owing to the variation in speed of the motor and its parts to be lubricated, and the corresponding variation in the speed of the feed roll.

As is well understood, the viscosity of oil varies with the temperature. Thick oil will be more rapidly gathered by the feed roll, in that the roll will carry a thicker film of thick oil than it will of thin oil. For this reason, it is necessary, or at least desirable to provide a means whereby the roll will deliver to the feed strip a film of oil of a predetermined thickness, irrespective of the viscosity thereof. This is accomplished by providing the strip 29 which is adjustable in respect to the surface or the periphery of the feed roll, and being placed in advance of the feed strip in the direction of rotation of the roll, it will remove from the roll any excess of oil, or the excess in the thickness of the film owing to the variation in the condition of the oil caused by the variation of temperature, and will cause the feed roll to deliver practically a uniform thickness of oil film to the feeder strip, and as a consequence, feed a uniform amount of oil irrespective of its condition to the several passage ways. This strip is preferably adjustable through the medium of suitable screws 34, and is readily accessible for the purpose of adjustment through the opening 30 in the wall of the box or chamber 1.

By locating the oil or lubricating chamber adjacent the explosive engine, it will receive some heat or warmth therefrom which will tend to keep the oil sufficiently thin to properly flow through the conductor tubes, and also tend to make the lubricator more accurate in its operation.

For the purpose of brevity in the claims, and for the purpose of enabling generic terms to be used, the strips 25 and 26 will be referred to as a gatherer, and the strip 29 as a remover.

While the drawings illustrate the oil passages 23 as formed in the wall of the lubricator, it will be readily understood that the passage way or ways may be formed of separate tubing, or indeed the tubes 24 might be extended into the chamber 12 and serve the same purpose and function as forming the passage ways in the wall of the chamber, as here illustrated.

Having thus described my invention, what I claim and desire to secure by Letters Patent, is:—

1. A lubricator including an oil chamber, a rotatable feed roll located therein, the oil chamber having an oil passage way extending thereinto, an oil gatherer adapted to gather the oil from the feed roll and deliver it to the oil passage, means for feeding oil to and maintaining it at a level within the chamber below the gatherer and the inlet end of the passage way, and an adjustable oil remover located adjacent the surface of the roll and at a point in advance of the said gatherer in respect to the direction of rotation of the feed roll.

2. A lubricator, comprising a casing having a plurality of oil feeding passage-ways with their inlet ends above the bottom of the casing, means for feeding oil to the casing, a rotatable roll in said casing, an oil gatherer consisting of an elongated plate extending longitudinal the roll and engaging the periphery thereof, and said plate having passage-ways converging towards and leading respectively to said oil passages.

3. A lubricator, comprising a casing having an enlarged oil containing compartment, a rotatable roll within said compartment, and a plurality of oil passages in communication with the compartment, and an oil feeding compartment at one end of the casing and communicating with the elongated compartment, means in the end compartment for containing oil therein at a predetermined level and thereby maintaining the same level in the elongated compartment.

4. A lubricator comprising a casing having a central elongated compartment and two end compartments, one end compartment having communications with the elongated compartment, and provided with means for maintaining oil therein at a predetermined level, a rotatable roll having a driving shaft extending into the other end compartment, and gears in said last mentioned end compartment for rotating the roll.

In testimony whereof I affix my signature in presence of two witnesses.

ALEXANDER WINTON.

Witnesses:
 HAROLD B. ANDERSON,
 HARRY L. OWESNEY.